United States Patent [19]

Shindo

[11] Patent Number: 4,939,357

[45] Date of Patent: Jul. 3, 1990

[54] OPTICAL SYSTEM FOR A FOCAL POINT DETECTING DEVICE

[75] Inventor: Osamu Shindo, Tokyo, Japan

[73] Assignee: Asahi Kogaku Kogyo K.K., Tokyo, Japan

[21] Appl. No.: 272,470

[22] Filed: Nov. 17, 1988

[30] Foreign Application Priority Data

Nov. 20, 1987 [JP] Japan .............................. 62-293750
Mar. 10, 1988 [JP] Japan ................................ 63-56777

[51] Int. Cl.$^5$ ............................................. G01J 1/20
[52] U.S. Cl. .................................. 250/201.1; 250/204
[58] Field of Search ................ 250/201, 204; 354/402, 354/404, 408

[56] References Cited

U.S. PATENT DOCUMENTS 4,580,042  4/1986  Tokutomi et al. ................. 250/204
4,716,431 12/1987  Shindo .
4,794,416 12/1988  Mukai et al. ...................... 354/402

FOREIGN PATENT DOCUMENTS

59-75209  4/1984  Japan .
60-32012  2/1985  Japan .
62-25715  2/1987  Japan .

Primary Examiner—David C. Nelms
Assistant Examiner—Khaled Shami
Attorney, Agent, or Firm—Sandler, Greenblum & Bernstein

[57] ABSTRACT

A condenser lens disposed behind a film equivalent plane, a pair of light splitting elements disposed behind the condenser lens, and a focal point detecting apparatus. The radius of curvature of a front surface of the condenser lens at the film equivalent plane side is larger than that of a rear surface of the condenser. A path length L from the film equivalent plane to the rear surface of the condenser lens is set in a range of 3.2 mm>L>3.6 mm on the assumption that the path length L is not substantially expanded by a refractive material. The pair of light splitting elements are disposed in symmetricy with respect to a meridian plane of the condenser lens. The focal point detecting apparatus is adapted to detect a focal point by finding a relative positional displacement of an objective image which is reimaged by the pair of light splitting elements. Due to the foregoing construction, in an optical system of a focal point detecting device of the present invention, even if a spherical lens, which is easy to manufacture, is used for a condenser lens, instead of an aspherical lens which is difficult to manufacture, the zone of focus can be made long enough so that the effect of dust on the condenser can be minimized. In addition, aberration distortion can be corrected thoroughly.

5 Claims, 4 Drawing Sheets

OPTICAL SYSTEM FOR A FOCAL POINT DETECTING DEVICE

BACKGROUND OF THE INVENTION

1. Field of the Invention

This invention relates to an optical system of a focal point detecting device used in a picture-taking/image producing device such as a camera or the like.

2. Description of the Prior Art

Heretofore, picture-taking devices such as cameras or the like have been known, in which the optical system of a focal point detecting device is disposed behind a film equivalent plane. Regarding the optical system of a focal point detecting device, many proposals have been made. These are of the type that an objective image is split into two images having a generally similar shape with each other and such generally similar two images were formed on a focal point detecting device, and the focal point is detected with reference to displacement of the positions of the two images. Examples of such an optical system as mentioned can be found in "Optical system of a focal point detecting device" Japanese Patent Application Early Laid-open Publication No. Sho 59-75209 or in "Focal point detecting device of camera, and Japanese Patent Application Early Laid-open Publication No. Sho 60-32012 or in "Optical system of focal point detecting device, Japanese Patent Application Early Laid-open Publication No. Sho 62-25715. In these Applications, in order to correct aberration distortion and distribution of illuminance, it is proposed that a condenser lens be formed in an aspherical shape. However, there are many problems in association with the condenser lens being formed in an aspherical shape.

A first problem is that the manufacture of a condenser lens in an aspherical shape is difficult.

More specifically, in general, in case a condenser lens is formed in an aspherical shape, lens material is precisely cut into a desired aspherical shape by the tool of a precision lathe. Thereafter, in order to remove cutting marks caused by the tool, the lens must be subjected to grinding treatment with much care so that the originally intended aspherical shape will not be deformed. However, at this time, even a slight deformation of the edge of the tool could result in a failure of the condenser lens to be precisely cut into a desired aspherical shape. Even if the condenser lens is precisely cut into a desired aspherical shape by the tool, the resulting shape is often undesirably deformed after it is subjected to the grinding treatment. Therefore, forming a condenser lens into an aspherical shape is very difficult.

A second problem is that if a condenser lens is formed in an aspherical shape, the inspection of the aspherical shape and the inspection of the profile irregularity cannot be carried out easily during mass production.

More specifically, in general, the inspection of the aspherical shape can be conducted by a three-dimensional measuring instrument or by an interferometer. However, in case the aspherical shape is inspected by the three-dimensional measuring instrument, too much time is required for the inspection because there are many measuring points. Although the aspherical shape and the profile irregularity can be inspected by an interferometer, when the aspherical shape and profile irregularity of a lens have a large aspherical coefficient or is displaced for from a spherical surface, is inspected by an interferometer, the number of the interference fringes becomes large and the inspection becomes difficult. In this way, if a condenser lens is formed in an aspherical shape, the inspection of the aspherical shape and the inspection of the profile irregularity cannot be carried out easily during in mass production.

Therefore, it is an important problem whether a condenser lens can be satisfactorily formed into a spherical shape.

As one method for solving this problem, one might think that a convex lens provided with, for example, a flat surface at one side thereof and a convex surface at the other side is used as a condenser lens and the convex surface side of the condenser lens is faced with a film equivalent plane side, whereas one of the principal flat surface side thereof is generally coincident with the film equivalent plane.

However, according to this method, a range-findable field-of-new, i.e., a zone for being in focus cannot be made long enough. In addition, the condenser lens is located to close to the film equivalent plane. As a result, if the outer surface of the condenser lens dusty, focusing accuracy would be adversely affected by the dust. Moreover, the aberration of distortion cannot be corrected satisfactorily.

SUMMARY OF THE INVENTION

It is therefore a principal object of the present invention to provide an optical system of a focal point detecting device, in which a spherical lens which is easy to be manufactured instead of an aspherical lens, difficult to be processed is used as a condenser lens and yet a range finding zone can be made long enough so that the condenser lens is not adversely affected by dust and aberration of distortion can be corrected thoroughly.

In order to achieve the above object, an optical system of a focal point detecting device of the present invention has a condenser lens disposed behind a film equivalent plane, a pair of light splitting means disposed behind the condenser lens, and a focal point detecting means. Furthermore, the radius of curvature of a front surface of the condenser lens at the film equivalent plane side is made larger than that of a rear surface thereof. A path length L from the film equivalent plane to the rear surface of the condenser lens is set in a range of 3.2 mm $<$ L $<$ 3.6 mm on the assumption that path length L is not expanded by a refractive material. The pair of light splitting means are disposed in symmetry with respect to a meridian plane of the condenser lens. The focal point detecting means is adapted to detect a focal point by finding a relative positional displacement of an objective image which is reimaged by the pair of light splitting means.

Another optical system of a focal point detecting device for achieving the above object has a condenser lens disposed behind a film equivalent plane, a pair of light detecting means, and a focal point detecting means. The condenser lens is formed with a front surface thereof at the film equivalent plane side in a convex shape and formed a rear surface thereof in a convex shape, and the radius of curvature of the front surface is made larger than that of the rear surface. A path length L from the film equivalent plane to the rear surface of the condenser lens is set in a range of 3.2 mm $<$ L $<$ 3.6 mm on the assumption that the path length L is not expanded by a refractive material. The pair of light splitting means are disposed behind the condenser lens through no refractive member and in symmetry with respect to a meridian plane of the condenser lens. The focal point detecting means is adapted to detect a focal point by finding a relative positional displacement of an objective image which is reimaged by the pair of light splitting means.

Still another optical system of a focal point detecting device for achieving the above object has a condenser lens disposed behind a film equivalent plane, a pair of light detecting means, an auxiliary lens and a focal point detecting means. The condenser lens is formed with a front surface thereof at the film equivalent plane side in a plane shape having an infinitive radius of curvature and a rear surface thereof in a convex shape. A path length L from the film equivalent plane to the rear surface of the condenser lens is set in a range of 3.2 mm<L<3.6 mm on the assumption that the path length L is not expanded by a refractive material. The pair of light splitting means are disposed behind the condenser lens and in symmetry with respect to a meridian plane of the condenser lens. The auxiliary lens is disposed between the light splitting means and the condenser lens and is formed with a front surface thereof in a convex shape. The focal point detecting means is adapted to detect a focal point by finding a relative positional displacement of an objective image which is reimaged by the pair of light splitting means.

In the above-mentioned optical systems, a plane parallel plate having a filtering function may be disposed between the film equivalent plate and the condenser lens and in parallel relation with the film equivalent plane. And, an infrared eliminating filter, etc. may be used as the plane parallel plate.

These and other objects, features and advantages of the present invention will be best appreciated upon reading of the following description of the invention when taken in conjunction with the attached drawings with the understanding that some modifications, variations and changes of the same could be made by the person skilled in the art to which the invention pertains without departing from the spirit of the invention or the scope of claims appended hereto.

DESCRIPTION OF THE PREFERRED EMBODIMENT

First Embodiment

Several embodiments of the present invention will be described with reference to the accompanying drawings.

Figure 1:
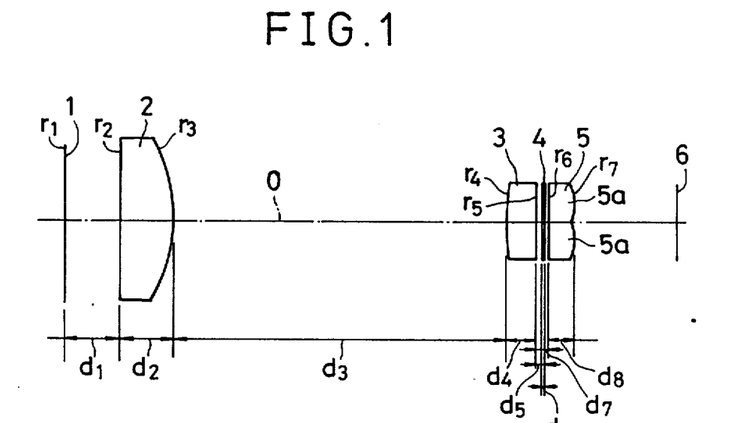
FIG. 1 is a schematic view showing a first embodiment of an optical system of a focal point detecting device according to the present invention.
Figure 3:
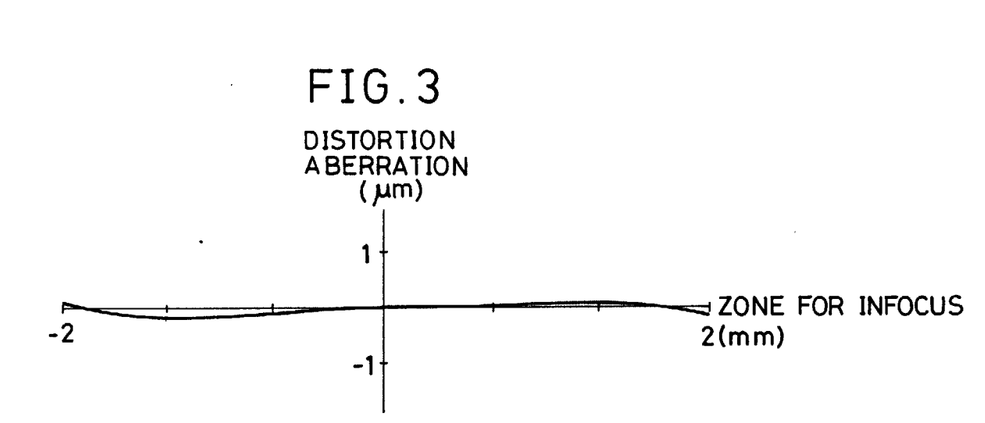
FIG. 3 is a schematic view showing aberration distortion of the first embodiment shown in Table 1.

FIGS. 1 and 3 illustrate a first embodiment of the present invention.

In FIG. 1, 1 denotes a film equivalent plane, and 2 denotes a condenser lens disposed behind the film equivalent plane 1 with a space therebetween. Behind the condenser lens 2, an auxiliary lens 3 is disposed with a space therebetween. Behind the auxiliary lens 3, there are arranged a field stop or a diaphragm mask 4 and a separator lens 5 in this order and in adjacent relation to each other. Further behind the separator lens 5, a sensor 6 is disposed and spaced from the separator lens 5. A photo diode array disposed in a linear shape in the horizontal direction (vertical direction in FIG. 1) is used as the sensor 6.

The separator lens 5 is disposed behind the condenser lens 2, as described, and has convex lens portions $5a$, $5a$, as a pair of light splitting means, disposed in symmetry with a meridian plane of the condenser lens 2 (with respect to an optical axis O in FIG. 1). The convex lens portions $5a$, $5a$ are adapted to reimage, by splitting an image, on a left and a right part of a light receiving surface of the sensor 6. The sensor 6 photoelectrically converts optical information regarding an image reimaged on the light receiving surface to an electrical signals and outputs the same. The output from the sensor 6 is input into a comparator (not shown) for interpretation, thereby to detect a relative positional displacement of an image of an object.

For easy understanding, one specific example will be described hereinafter, wherein a distance between the film equivalent plane 1 and the condenser lens 2 is represented by $d_1$, the thickness of the condenser lens 2 is represented by $d_2$, the distance between the condenser lens 2 and the auxiliary lens 3 is represented by $d_3$, the thickness of the auxiliary lens 3 is represented by $d_4$, the distance between the auxiliary lens 3 and the diaphragm mask 4 is represented by $d_5$, the thickness of the diaphragm mask 4 is represented by $d_6$, the distance between the diaphragm mask 4 and the separator lens 5 is represented by $d_7$, the thickness of the separator lens 5 is represented by $d_8$, the radius of curvature of the film equivalent plane 1 is represented by $r_1$, the front and the rear surfaces of the condenser lens 2 are represented by $r_2$ and $r_3$ respectively, the radii of curvature of the front and the rear surfaces of the auxiliary lens 3 are represented by $r_4$ and $r_5$ respectively, and the radii of curvature of the front and rear surfaces of the separator lens 5 are represented by $r_6$ and $r_7$ respectively.

In an optical system of a focal point detecting system as shown in FIG. 1, the factors for affecting the aberration distortion were checked by varying various parameters. As a result, it was found that not only the variation of an optical constant of the condenser lens 2 but also the distance $d_1$ between the film equivalent plane 1 and the condenser lens 2 have a large effect on the aberration of curvature.

Therefore, an aspherical coefficient k of the rear surface of the condenser lens 2 and the distance $d_1$ were varied to correct the the aberration distortion in every possible way. If an aberration distortion, which remained when the focus zone for was 2 mm after correction, is represented by μm, the relation between k and d is shown by a graph of FIG. 2. It is to be noted that these are not normalized to percentage (the same expression will be used hereinafter).

Figure 2:
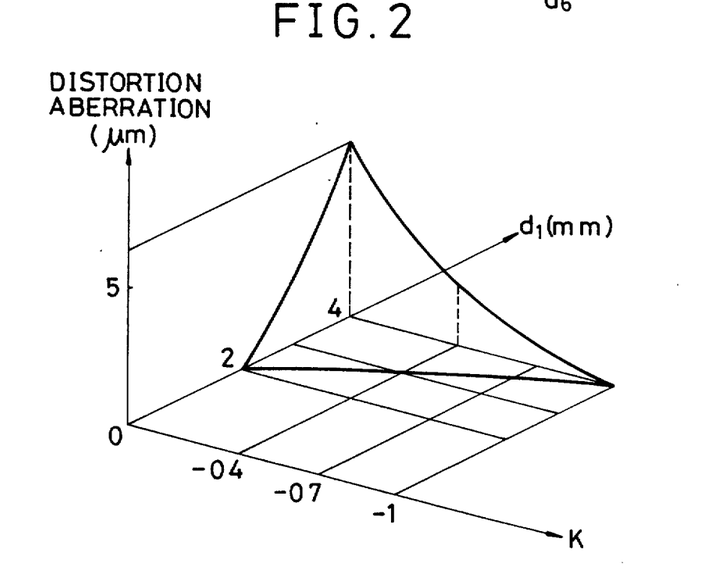
FIG. 2 is a schematic view showing variation of aberration distortion when a distance between a film equivalent plane and a condenser lens of FIG. 1 is varied.

As is apparent from FIG. 2, when the distance $d_1$ was about 2 mm, the aspherical coefficient was zero (k=0). That is, the rear surface of the condenser lens 2 became spherical. At that time, the aberration of distortion μm also became zero (see FIG. 3).

Data of variable parameters of the optical system at that time is shown in the following Table 1.

TABLE 1

| | Radius of curvature (r) mm | Distance (d) mm | Refractive index (n) |
|---|---|---|---|
| Film equivalent plane | $r_1 = \infty$ | $d_1 = 2.11$ | 1.00000 |
| Condenser lens | $r_2 = \infty$ | $d_2 = 2.00$ | 1.49186 |
| | $r_3 = -6.000$ | $d_3 = 12.21$ | 1.00000 |
| Auxiliary lens | $r_4 = 10.416$ | $d_4 = 1.2$ | 1.49186 |
| | $r_5 = \infty$ | | |
| Diaphragm mask (core distance 1.1 mm) | | $d_5 = 0$ | 1.00000 |
| | | $d_6 = 0.04$ | 1.00000 |
| | | $d_7 = 0.1$ | 1.00000 |
| Separator lens (core distance 1.263 mm) | $r_6 = \infty$ | | |
| | $r_8 = -2.000$ | $d_8 = 2.05$ | 1.58547 |

Second Embodiment

Figure 4:
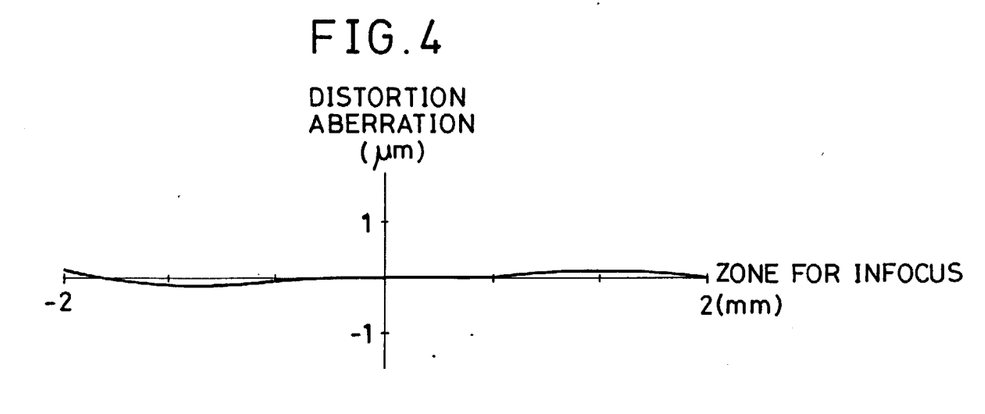
FIG. 4 is a schematic view showing aberration distortion of a second embodiment shown in Table 2.

FIG. 4 illustrates a schematic view showing aberration distorsion of a second embodiment of the present invention as shown in Table 2. This embodiment shows an example for obtaining a distance $d_1$ and an aberration distortion in the same manner as the first embodiment in case a distance $d_3$ between the condenser lens 2 and the auxiliary lens 3 is shorter than the comparable distance in the first embodiment.

TABLE 2

| | Radius of curvature (r) mm | Distance (d) mm | Refractive index (n) |
|---|---|---|---|
| Film equivalent plane | $r_1 = \infty$ | $d_1 = 1.96$ | 1.00000 |
| Condenser lens | $r_2 = \infty$ | $d_2 = 2.00$ | 1.419186 |
| | $r_3 = -5.839$ | $d_3 = 10.50$ | 1.00000 |
| Auxiliary lens | $r_4 = 12.500$ | $d_4 = 1.2$ | 1.49186 |
| | $r_5 = \infty$ | | |
| Diaphragm mask (core distance 1.0 mm) | | $d_5 = 0$ | 1.00000 |
| | | $d_6 = 0.04$ | 1.00000 |
| | | $d_7 = 0$ | 1.00000 |
| Separator lens (core distance 1.12 mm) | $r_6 = \infty$ | | |
| | $r_8 = -1.700$ | $d_8 = 1.25$ | 1.58547 |

In this embodiment, the aberration of distortion also became zero as shown in FIG. 4.

Third Embodiment

Figures 5, 6:
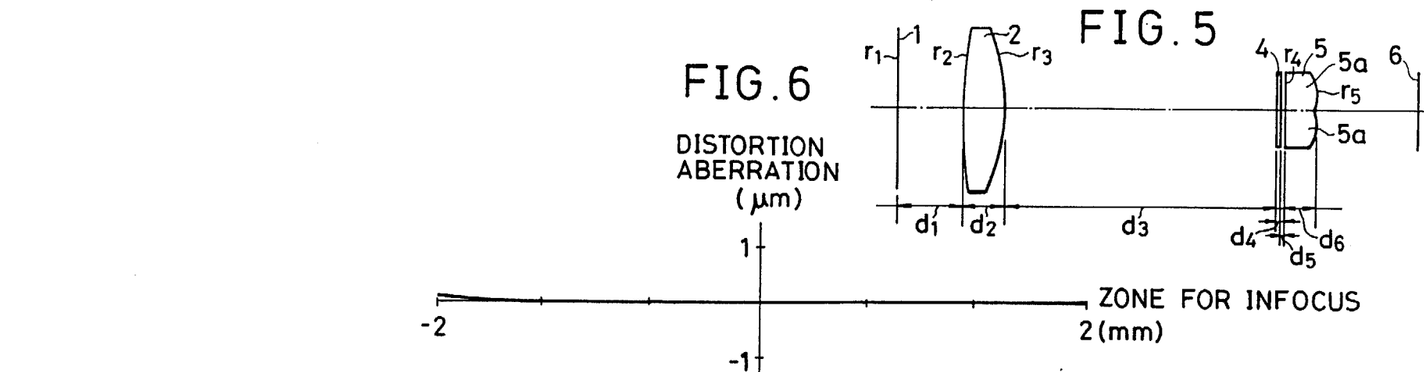
FIG. 5 is a schematic view showing a third embodiment of an optical system of a focal point detecting device according to the present invention.
FIG. 6 is a schematic view showing aberration distortion of the third embodiment.

FIGS. 5 and 6 illustrate a third embodiment of the present invention. This embodiment shows an optical system in which the auxiliary lens 3 of FIG. 1 is omitted.

In this embodiment, the residual aberration distortion at various points of the zone for infocus were obtained in the same manner as in the first embodiment. The results are shown in Table 3.

Table 3 shows the data when a distance between the film equivalent plane 1 and the condenser lens 2 is represented by $d_1$, the thickness of the condenser lens 2 is represented by $d_2$, the distance between the condenser lens 2 and the diaphragm mask 4 is represented by $d_3$, the thickness of the diaphragm mask 4 is represented by $d_4$, the distance between the the diaphragm mask 4 and the separator lens 5 is represented by $d_5$, the thickness of the separator lens 5 is represented by $d_6$, the radius of curvature of the film equivalent plane 1 is represented by $r_1$, the radii of the front and the rear surfaces of the condenser lens 2 are represented by $r_2$ and $r_3$ respectively, and the radii of curvature of the front and the rear surfaces of the separtor lens 5 are represented by $r_4$ and $r_5$ respectively.

TABLE 3

| | Radius of curvature (r) mm | Distance (d) mm | Refractive index (n) |
|---|---|---|---|
| Film equivalent plane | $r_1 = \infty$ | $d_1 = 2.00$ | 1.00000 |
| Condenser lens | $r_2 = 18.000$ | $d_2 = 2.20$ | 1.49186 |
| | $r_3 = -7.684$ | $d_3 = 10.30$ | 1.00000 |
| Diaphragm mask (core distance 0.98 mm) | | $d_4 = 0.04$ | 1.00000 |
| | | $d_5 = 0$ | 1.00000 |
| Separator lens (core distance 1.1 mm) | $r_4 = \infty$ | | |
| | $r_5 = -1.500$ | $d_6 = 1.20$ | 1.49186 |

In this embodiment, the aberration distortion became approximately zero as shown in FIG. 6.

Fourth Embodiment

Figure 7:
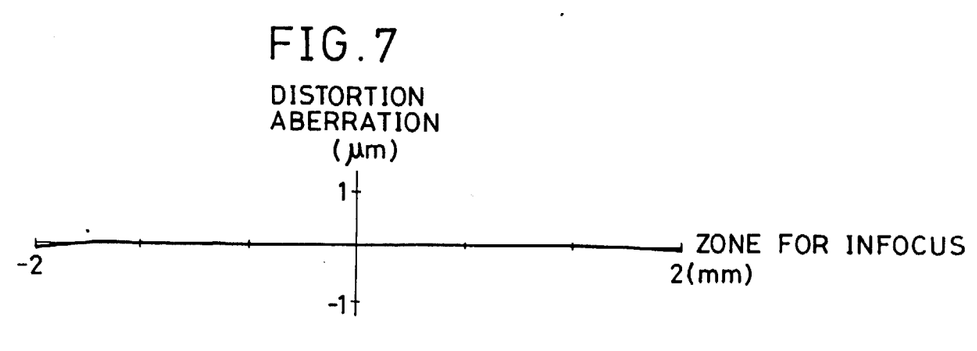
FIG. 7 is a schematic view showing aberration distortion of a fourth embodiment shown in Table 4.

FIG. 7 illustrates a schematic view showing aberration distorsion of a fourth embodiment of the present invention shown in Table 4. This embodiment shows an example in which the thickness $d_2$ of the condenser lens 2 in the third embodiment is varied. In this embodiment, the residual aberrations distortion at various points of the focus zone were obtained in the same manner as in the first embodiment. The results are shown in the following Table 4.

TABLE 4

| | Radius of curvature (r) mm | Distance (d) mm | Refractive index (n) |
|---|---|---|---|
| Film equivalent plane | $r_1 = \infty$ | $d_1 = 2.40$ | 1.00000 |
| Condenser lens | $r_2 = 19.000$ | $d_2 = 1.50$ | 1.49186 |
| | $r_3 = -7.572$ | $d_3 = 10.30$ | 1.00000 |
| Diaphragm mask (core distance 0.98 mm) | | $d_4 = 0.04$ | 1.00000 |
| | | $d_5 = 0$ | 1.00000 |
| Separator lens (core distance 1.1 mm) | $r_4 = \infty$ | | |
| | $r_5 = -1.500$ | $d_6 = 1.20$ | 1.49186 |

In this embodiment, the aberration distortion also became approximately zero as shown in FIG. 7.

Next, let us study a case where, just for simplicity, no reflective optical material is disposed between the film equivalent plane 1 and the condenser lens 2 of the above-mentioned embodiments. In other words, a beam of light passed through the film equivalent plane 1 is directly incident into the condenser lens 2. If a path length from the film equivalent plane 1 to the rear surface of the condenser lens 2 is represented by L, assuming that there is no expansion in the thickness of the condenser lens 2 and if the refractive index of the condenser lens 2 is represented by n, the path length L is expressed as follows;

$$L = d_1 + \frac{d_2}{n}$$

The path lengths of the above-mentioned embodiments were obtained by putting the various data of the embodiments into this formula. The results are shown in the following Table 5.

TABLE 5

| | Path length L (mm) |
|---|---|
| First embodiment | 3.45 |
| Second Embodiment | 3.30 |
| Third Embodiment | 3.47 |
| Fourth Embodiment | 3.41 |

As seen from these results, attention should be paid to the fact that the path lengths obtained for the four embodiments having different optical constitutions and different optical constants are concentrated in a very narrow range from 3.30 mm to 3.47 mm. In case the path lengths are larger than the above-mentioned values, it is apparent from the prior art that the condenser lens 2 is difficult to form spherically.

However, this does not mean that the condenser lens 2 cannot be made spherical unless the path length L has the above-mentioned value. That is, it is known that when the path length L is smaller than the above-mentioned value, the condenser lens 2 can be made spherical depending on its design.

In short, it is known that the above-mentioned value was a generally upper limit value for making the condenser lens 2 spherical. Therefore, if a value range thereof is selected, there can be obtained a space between the film equivalent plane 1 and the condenser lens 2 large enough to minimize the effect of dust, etc. outer surface of the condenser lens 2 by making the thickness of the condenser lens 2 as thin as possible. For example, if the thickness of the condenser lens 2 is made 2 mm, the space becomes approximately 2 mm which is a distance large enough to avoid the effect of the dust.

Therefore, if the path length L for making the condenser lens spherical and for minimizing the effect of dust is found from the average values of the above-mentioned four values, it becomes;

$$\chi - 3\sigma < L < \chi + 3\sigma$$

that is, it can be considered that the most suitable value is as follows;

$$3.2 \text{ mm} < L < 3.6 \text{ mm}$$

Furthermore, what can be said for all of the above-mentioned embodiments is that the radius of curvature of the front surface is larger than that of the rear surface. This is also one of the conditions for making the condenser lens 2 spherical.

The reason for this is that the solution for minimizing the aberration distortion when the bending correction of the condenser lens is performed is present only when the radius of curvature of the front surface is larger than that of the rear surface and it is not present when the radius of curvature of the rear surface is larger than that of the front surface.

Figure 8:
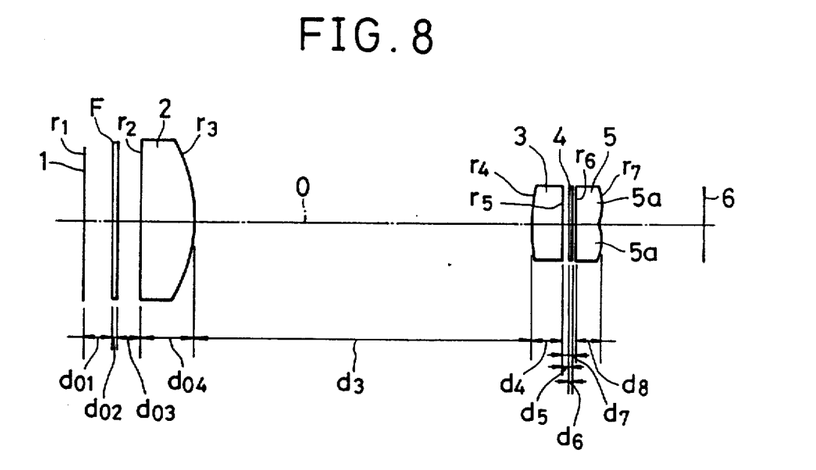
FIGS. 8 and 9 are schematic views showing optical systems according to a fifth and a sixth embodiments of the present invention.
Figure 9:
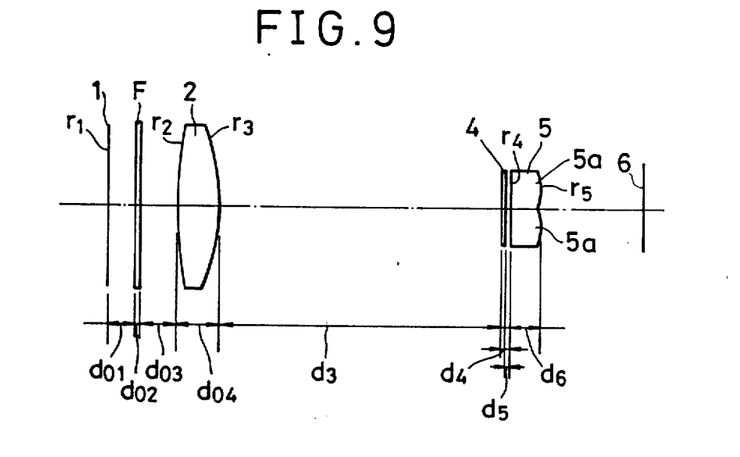

In the above-mentioned embodiment, no light refracting material is disposed between the film equivalent plane 1 and the condenser lens 2. However, the present invention is not necessarily limited to this. For example, as shown in FIGS. 8 and 9, an infrared filter F as a plane parallel plate may be disposed between the film equivalent plane 1 and the condenser lens 2 of the optical system shown in FIGS. 1 and 5.

In that case, if a distance from the film equivalent plane 1 to the infrared filter F is represented by $d_{01}$, the thickness of the infrared filter F being represented by $d_{02}$, a distance from the infrared filter F to the condenser lens 2 being represented by $d_{03}$, the thickness of the condenser lens 2 being represented by $d_{04}$, and the refractive indexes of the infrared cut filter filter F and the condenser lens 2 being represented by $n_{02}$ and $n_{04}$ respectively, the formula (1) can be expressed as follows;

$$L = d_{01} + \frac{d_{02}}{n_{02}} + d_{03} + \frac{d_{04}}{n_{04}}$$

Therefore, the above-mentioned content is satisfied even if a plane parallel plate is disposed between the film equivalent plane and the condenser lens.

Since the present invention is constituted in the manner as described in the foregoing, even if a spherical lens which is easy to be manufactured is used as a condenser lens instead of the use of an aspherical lens which is difficult to be manufactured, the zone of focus can be made long enough so that the effect of dust can be minimized. In addition, the aberration distortion can be corrected thoroughly.

What is claimed is:

1. An optical system of a focal point detecting device comprising:
    a condenser lens disposed behind a film equivalent plane, the radius of curvature of a front surface of said condenser lens at the film equivalent plane side being larger than that of a rear surface of said condenser lens, a path length L from said film equivalent plane to the rear surface of said condenser lens being in a range of 3.2 mm < L < 3.6 mm when the path length is not substantially expanded by a refractive material;
    a pair of light splitting means disposed behind the condenser lens and in symmetry with respect to a meridian plane of said condenser lens; and
    a focal point detecting means adapted to detect a focal point by finding a relative positional displacement of an objective image which is reimaged by said pair of light splitting means.

2. An optical system of a focal point detecting device comprising:
    a condenser lens disposed behind a film equivalent plane and formed with a front surface thereof at the film equivalent plane side in a convex shape and formed with a rear surface thereof in a convex shape, the radius of curvature of the front surface of said condenser lens being larger than that of the rear surface of said condenser lens, a path length L from the film equivalent plane to the rear surface of said condenser lens being set in a range of 3.2 mm<L<3.6 mm when the path length L is not substantially expanded by a refractive material;

a pair of light splitting means disposed behind said condenser lens through no refractive member and in symmetry with respect to a meridian plane of said condenser lens; and a focal point detecting means adapted to detect a focal point by finding a relative positional displacement of an objective image which is reimaged by said pair of light splitting means.

3. An optical system of a focal point detecting device comprising:

a condenser lens disposed behind a film equivalent plane and formed with a front surface thereof at the film equivalent plane side in a plain shape having an infinitive radius of curvature and a rear surface thereof in a convex shape, a path length L from the film equivalent plane to the rear surface of said condenser lens being in a range of 3.2 mm<L<3.6 mm when the path length L is not substantially expanded by a refractive material;

a pair of light splitting means disposed behind said condenser lens and in symmetry with respect to a meridian plane of said condenser lens;

4. An optical system of a focal point detecting device according to any one of claims 1 through 3, wherein a plane parallel plate having a filtering function is disposed between said film equivalent plane and said condenser lens and in parallel relation with said film equivalent plane.

5. An optical system of a focal point detecting device according to claim 4, wherein said plane parallel plate is an infrared eliminating-filter.

* * * * *

UNITED STATES PATENT AND TRADEMARK OFFICE
CERTIFICATE OF CORRECTION

PATENT NO. : 4,939,357

DATED : July 3, 1990

INVENTOR(S) : Osamu Shindo

Page 1 of 2

It is certified that error appears in the above-indentified patent and that said Letters Patent is hereby corrected as shown below:

Abstract, line 9, change "ァレァ" to --ァレァ--.
Abstract, line 12, change "symmetricy" --symmetry--.
Column 1, line 23, insert --,-- after "device".
Column 1, line 28, change "device,"to --device",
Column 1, line 26, delete "[and]".
Column 1, line 66, change "for" to --far--.
Column 2, line 4, delete "[in]".
Column 2, line 17, change "field-of-new" to --field-of-view--.
Column 2, line 19, change "to" to --too--after "located".
Column 2, line 20, insert --is-- before "dusty".
Column 2, line 31, change "lens" and" to --lens; and- --.
Column 2, line 59, insert -- with--after "formed".
Column 3, line 30, change "plate" to --plane--.
Column 4, line 33, change "signals" to --signal--.
Column 4, line 67, change "the the" to -- the --.

Column 5, line 1, delete "[for]".
Column 5, line 2, change "d" to --d,--.
Column 5, line 9, delete "[of]".
Column 5, line 35, change "distorsion" to --distortion--.

Column 5, line 49, change "1.419186" ot --1.49186--.
Column 5, line 57, change "corc" to --core--.
Column 1, line 25, change "camera," to --camera",--.

UNITED STATES PATENT AND TRADEMARK OFFICE
CERTIFICATE OF CORRECTION

PATENT NO. : 4,939,357
DATED : July 3, 1990
INVENTOR(S) : Osamu Shindo

It is certified that error appears in the above-indentified patent and that said Letters Patent is hereby corrected as shown below:

```
At column 5, line 68, change "zone for in focus" to --focus zone--.
Column 6, line 16, change "separtor" to --separator--;
          line 40, change "distorsion" to --distortion--;
          line 41, insert --as-- before "shown";
          line 44, change "aberrations" to --aberration--.
At column 7, line 45, insert --on the-- before "outer";
          line 53, change ";" to --:--.
At column 8, line 1, insert --2-- after "lens";
          line 21, change "cut filter filter" to --filter--.
At column 10, line 17, (i.e., claim 5, line 3), change "eliminating-filter"
to --eliminating filter--.
At column 10, between lines 7 and 8 (i.e., in claim 3, after the last line
thereof), insert --an auxiliary lens disposed between said light splitting
means and said condenser lens, said auxiliary lens being formed with a
front surface thereof in a converse shape; and
     a focal point detecting means adapted to detect a focal objective
image which is reimaged by said pair of light splitting means--.
```

Signed and Sealed this

Seventeenth Day of August, 1993

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 4,939,357

DATED : July 3, 1990

INVENTOR(S) : Osamu Shindo

Page 1 of 2

It is certified that error appears in the above-indentified patent and that said Letters Patent is hereby corrected as shown below:

On title page,

Abstract, line 9, change "> L >" to -- < L < --.

Abstract, line 12, change "symmetricy" --symmetry--.
Column 1, line 23, insert --,-- after "device".
Column 1, line 28, change "device,"to --device",--
Column 1, line 26, delete "[and]".
Column 1, line 66, change "for" to --far--.
Column 2, line 4, delete "[in]".
Column 2, line 17, change "field-of-new" to --field-of-view--.
Column 2, line 19, change "to" to --too--after "located".
Column 2, line 20, insert --is-- before "dusty".
Column 2, line 31, change "lens" and" to --lens; and- --.
Column 2, line 59, insert -- with--after "formed".
Column 3, line 30, change "plate" to --plane--.
Column 4, line 33, change "signals" to --signal--.
Column 4, line 67, change "the the" to -- the --.

Column 5, line 1, delete "[for]".
Column 5, line 2, change "d" to --d,--.
Column 5, line 9, delete "[of]".
Column 5, line 35, change "distorsion" to --distortion--.

Column 5, line 49, change "1.419186" ot --1.49186--.
Column 5, line 57, change "corc" to --core--.
Column 1, line 25, change "camera," to --camera",--.

UNITED STATES PATENT AND TRADEMARK OFFICE
CERTIFICATE OF CORRECTION

PATENT NO. : 4,939,357
DATED : July 3, 1990
INVENTOR(S) : Osamu Shindo

It is certified that error appears in the above-indentified patent and that said Letters Patent is hereby corrected as shown below:

At column 5, line 68, change "zone for in focus" to --focus zone--.
Column 6, line 16, change "separtor" to --separator--;
       line 40, change "distorsion" to --distortion--;
       line 41, insert --as-- before "shown";
       line 44, change "aberrations" to --aberration--.
At column 7, line 45, insert --on the-- before "outer";
       line 53, change ";" to --:--.
At column 8, line 1, insert --2-- after "lens";
       line 21, change "cut filter filter" to --filter--.
At column 10, line 17, (i.e., claim 5, line 3), change "eliminating-filter" to --eliminating filter--.
At column 10, between lines 7 and 8 (i.e., in claim 3, after the last line thereof), insert --an auxiliary lens disposed between said light splitting means and said condenser lens, said auxiliary lens being formed with a front surface thereof in a converse shape; and
    a focal point detecting means adapted to detect a focal objective image which is reimaged by said pair of light splitting means--.

This certificate supersedes Certificate of Correction issued August 17, 1993.

Signed and Sealed this

Twenty-ninth Day of November, 1994

Attest:

BRUCE LEHMAN

Attesting Officer

Commissioner of Patents and Trademarks